3,340,300
TRIMETHOXY BENZOYLACETALDEHYDE
OXIMES
Sidney Robert Safir, River Edge, N.J., and Richard P. Williams, Tomkins Cove, N.Y., assignors to American Cyanamid Company, Stamford, Conn., a corporation of Maine
No Drawing. Filed Oct. 5, 1964, Ser. No. 401,283
5 Claims. (Cl. 260—566)

This invention relates to new organic compounds. More particularly, it relates to substituted benzoylacetaldehydes and method of preparing the same.

The novel compounds of the present invention are described as (3',4',5' - trimethoxybenzoyl)acetaldehyde, 1-O-lower alkyloximes, 1-O-lower alkenyloximes, and 1-O-monocyclic arlyoximes which may be represented by the following formula:

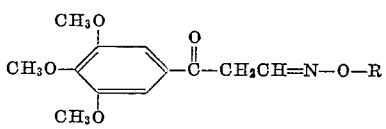

wherein R is selected from the group consisting of lower alkyl, lower alkenyl and monocyclic aryl groups.

The compounds of this invention may exist in other tautomeric forms:

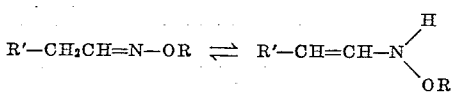

wherein R' is the 3',4',5'-trimethoxybenzoyl group and R is defined above. In the present invention the description of one form is intended to include tautomeric forms thereof.

The compounds of the invention are, in general, low melting crystalline solids or oils.

The compounds of the present invention show central nervous system depressant activity which makes them useful as medicaments. For example, they may be used as sedatives, hypnotics, tranquilizers and muscle relaxants. They have the advantage of forming stable water-soluble alkali metal salts, whose solutions, upon intravenous administration, produce a state of general anesthesia. Furthermore, the compounds of this invention can be dispensed in the usual pharmaceutical forms such as tablets, capsules, oblets and the like the preparation of which is well known in the compounding arts.

The compounds may be prepared by reacting 3,4,5-trimethoxybenzaldehyde with acetylene in the presence of an alkali metal such as sodium in an appropriate solvent, e.g., liquid ammonia. The reaction is usualy carried out at the reflux temperature of the solvent employed (about −30° when liquid ammonia is used). After acidification the resulting α-ethynyl-3,4,5-trimethoxybenzyl alcohol may then be treated with an oxidizing agent such as chromic anhydride to form the corresponding 3',4',5' - trimethoxypropiolophenone. This reaction is usually carried out in dilute acid at −10° C. to +10° C. The resulting product may then be reacted with an O-alkylhydroxylamine, O - alkenylhydroxylamine or O - monocycloarylhydroxylamine at temperatures between 0° C. and 56° C. in a solvent such as methanol, ether or benzene or mixtures thereof to form the corresponding (3',4',5'-trimethoxybenzoyl)-acetaldehyde oxime ether. The above reactions are illustrated by the following equations:

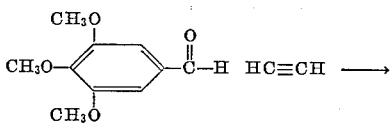

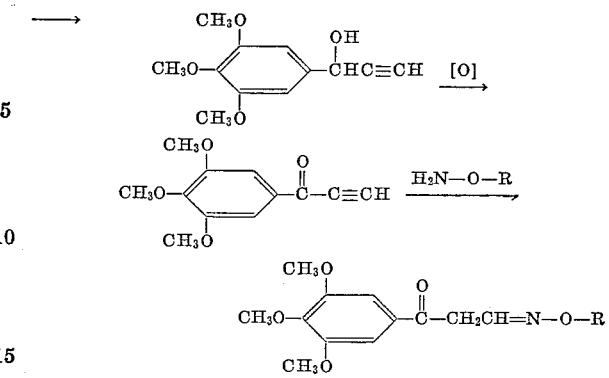

wherein R is lower alkyl, lower alkenyl or monocyclic aryl.

Alternatively, 3',4',5' - trimethoxyacetophenone is reacted with ethyl formate using a condensing agent such as sodium hydride, sodium ethoxide or sodium metal in a nonpolar solvent such as ether to give the sodium salt of β - (3,4,5 - trimethoxybenzoyl)vinyl alcohol. This product may then be reacted with the appropriate O-alkylhydroxylamine salt, O - alkenylhydroxylamine salt or O-monocyclic arylhydroxylamine salt (hydrochloride, sulfate or the like) to give the corresponding (3',4',5'-trimethoxybenzoyl)acetaldehyde, 1 - O-alkyloxime, 1 - O-alkenyloxime or 1 - O - monocyclic aryloxime. This series of reactions may be illustrated by the following equations wherein R is lower alkyl, lower alkenyl or mono-cyclic aryl:

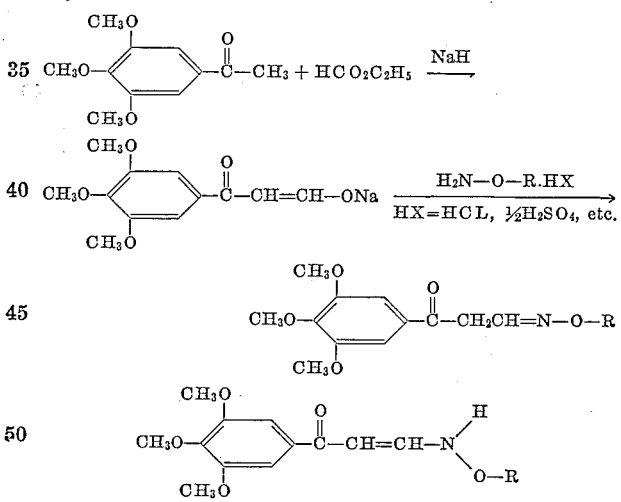

wherein R is as defined hereinbefore.

The invention will be described in greater detail in conjunction with the following specific examples.

EXAMPLE 1

*Preparation of α-ethynyl-3,4,5-trimethoxybenzyl alcohol*

In a 2-liter 3-necked flask equipped with a Dry Ice-acetone reflux condenser and bath, stirrer, dropping funnel and gas inlet tube is collected 1 liter of liquid ammonia. Then acetylene, purified by passing through concentrated sulfuric acid and soda lime is bubbled through the stirred ammonia for a few minutes. Sodium metal (11.5 g., 0.5 g. atom) cut into small pieces is added portionwise at such a rate that the transient blue color formed lasts for only a second while continuing to stir and bubble in acetylene. After the addition is completed (about 15 minutes) the cloudy solution is stirred for an additional 15 minutes. Then 98.1 g. (0.5 mole) of finely powdered 3,4,5-trimethoxybenzaldehyde and 400 ml. of ether are added portionwise as a slurry during 30 minutes with rapid stirring and addition of acetylene to the reaction mixture which slowly changes from colorless to dark brown during the addition. Then the reaction is stirred for an additional 3 hours after which the ammonia is allowed to evaporate. The brown gummy residue from the reaction is acidified with 2 N sulfuric acid after adding an additional 400 ml. of ether and chilling. The aqueous solution (pH 2) is separated from the ether and re-extracted twice. The combined ether extracts are washed with saturated sodium bisulfite, sodium bicarbonate and finally sodium chloride solutions before drying with anhydrous magnesium sulfate. After removing the solvent 93 g. (84%) of crude orange oily α-ethynyl-3,4,5-trimethoxybenzyl alcohol is obtained.

EXAMPLE 2

*Preparation of 3',4',5'-trimethoxypropiolophenone*

To a chilled solution under nitrogen of 83 g. (0.37 mole) of crude undistilled α-ethynyl-3,4,5-trimethoxybenzyl alcohol in 540 ml. of acetone is added dropwise under nitrogen during 50 minutes a chilled (0–5° C.) solution of 32.7 g. of chromic anhydride in 92 ml. of water and 27 ml. of concentrated sulfuric acid with efficient stirring. The reaction mixture first turns purple and then becomes dark green and a heavy precipitate forms. After the addition period the reaction is allowed to warm to room temperature and stirred for 30 minutes. Then 2.5 liters of water is added slowly with stirring and after chilling the crude crystals are removed, washed with water and dried under reduced pressure to give 48.5 g. (59%) of yellow crystals, melting point 122–128° C. of 3',4',5'-trimethoxypropiolophenone.

EXAMPLE 3

*Preparation of (3',4',5'-trimethoxybenzoyl)acetaldehyde, 1-O-ethyloxime*

To a solution of 3.16 g. of trimethoxypropiolophenone (0.014 mole) in a mixture of 200 ml. of methanol and 200 ml. of ether is added 1.32 g. (0.028 mole) of methoxyamine in ether. The solution is allowed to stand at room temperature for two days until the reaction is completed and then the solvent is removed from the reaction mixture. The residual brown oil is evaporatively distilled at 110° C./0.01 mm. to give 2.25 g. (60%) of colorless plates of (3',4',5'-trimethoxybenzoyl)acetaldehyde, 1-O-methyloxime, melting point 68–70° C.

EXAMPLE 4

*Preparation of (3',4',5'-trimethoxybenzoyl)acetaldehyde, 1-O-ethyloxime*

A mixture of 2.0 g. of 3',4',5'-trimethoxypropiolophenone and 1.1 g. of ethoxyamine in 100 ml. of methanol is refluxed for 4 hours, then the solvent removed to give a brown oil. Evaporative distillation of the oil gives 0.8 g. of colorless needles, melting point 52–62° C. Recrystallization several times form acetone using Dry Ice cooling gives colorless needles of (3',4',5'-trimethoxybenzoyl)acetaldehyde, 1-O-ethyloxime, melting point 68–69.0° C.

EXAMPLE 5

*Preparation of the sodium salt of β-(3,4,5-trimethoxybenzoyl)vinyl alcohol*

In a 2-liter 3-necked flask equipped with reflux condenser, stirrer, gas inlet tube, dropping funnel and heating mantle is placed 11 g. of sodium hydride (55% in oil) and 120 ml. of anhydrous ether after purging the system with nitrogen. Then a solution of 39 ml. of ethyl formate in 120 ml. of ether is added with stirring during 10 minutes at 10° C. After adding a small amount of ethanol to initiate the reaction a solution of 50.4 g. of 3,4,5-trimethoxyacetophenone in 1500 ml. of ether is added during 30 minutes. When the addition is completed the reaction is refluxed for 2.5 hours and allowed to stand for several hours. Then 100 ml. of ethanol is added and the precipitate that has formed is removed by filtration, washed with ether and dried to give 72 g. of the sodium salt of β-(3,4,5-trimethoxybenzoyl)vinyl alcohol, melting point 170° C.

EXAMPLE 6

*Preparation of (3',4',5'-trimethoxybenzoyl)acetaldehyde, 1-O-ethyloxime*

A solution of 10.1 g. of the sodium salt of β-(3',4',5'-trimethoxybenzoyl)vinyl alcohol and 3.8 g. of ethoxyamine hydrochloride in 100 ml. of 50% aqueous ethanol is refluxed for 2 hours. Then the reaction mixture is chilled and filtered to remove 72 g. of crude yellow needles, melting point 50–64° C. (65%). After recrystallization from hot ethanol and chilling in a Dry Ice-acetone bath 3.2 g. of nearly colorless needles, melting point 64–66° C. of (3',4',5'-trimethoxybenzoyl)acetaldehyde, 1-O-ethyloxime is obtained.

EXAMPLES 7, 8 AND 9

The following compounds were prepared by reacting the sodium salt of β-(3,4,5-trimethoxybenzoyl)vinyl alcohol with methoxyamine hydrochloride, allyloxyamine hydrochlorides and phenoxyamine hydrochloride as described in Example 6.

| Example No. | R | M.P., ° C. |
| --- | --- | --- |
| 7 | CH₃— | 66–70. |
| 8 | CH₂=CH—CH₂— | Oil, evap. dist. at 120°/0.01 mm. |
| 9 | ⟨phenyl⟩ | 86–88. |

We claim:
1. A compound selected from those of the formula:

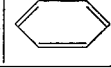

wherein R is selected from the group consisting of lower alkyl, lower alkenyl and monocyclic aryl and its alkali metal salts.

2. The compound (3',4',5'-trimethoxybenzoyl)acetaldehyde, 1-O-methyloxime.
3. The compound (3',4',5'-trimethoxybenzoyl)acetaldehyde, 1-O-ethyloxime.
4. The compound (3',4',5'-trimethoxybenzoyl)acetaldehyde, 1-O-allyloxime.
5. The compound (3',4',5'-trimethoxybenzoyl)acetaldehyde, 1-O-phenyloxime.

References Cited

UNITED STATES PATENTS 2,733,268  1/1956  Doerner _____ 260—566
3,184,510  5/1965  Levy _____ 260—566

OTHER REFERENCES

Mumm et al.: "Berichte," vol. 70B, page 1944 (1937), QD 1 D4.

CHARLES B. PARKER, *Primary Examiner.*

ROBERT V. HINES, *Assistant Examiner.*